Feb. 18, 1936. J. REUTHER 2,031,547
POTATO PLANTER
Filed Aug. 16, 1934 2 Sheets-Sheet 1

Inventor,
John Reuther,
by Walter P. Geyer
Attorney.

Feb. 18, 1936.    J. REUTHER    2,031,547
POTATO PLANTER
Filed Aug. 16, 1934    2 Sheets-Sheet 2
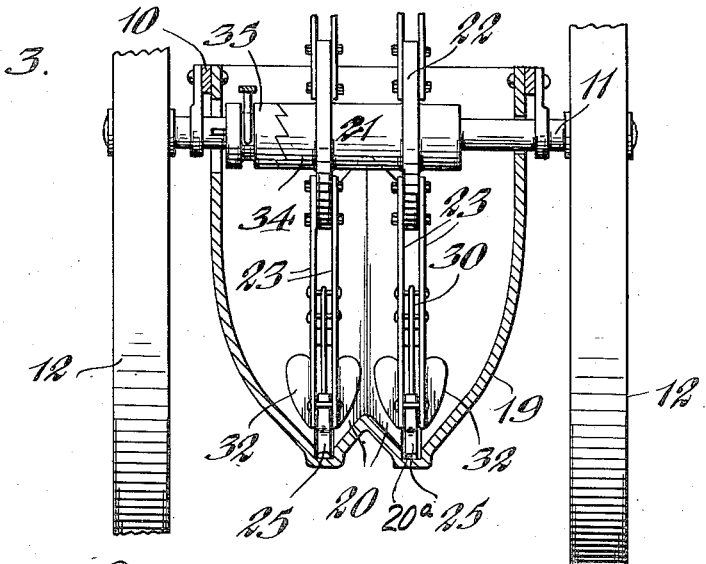
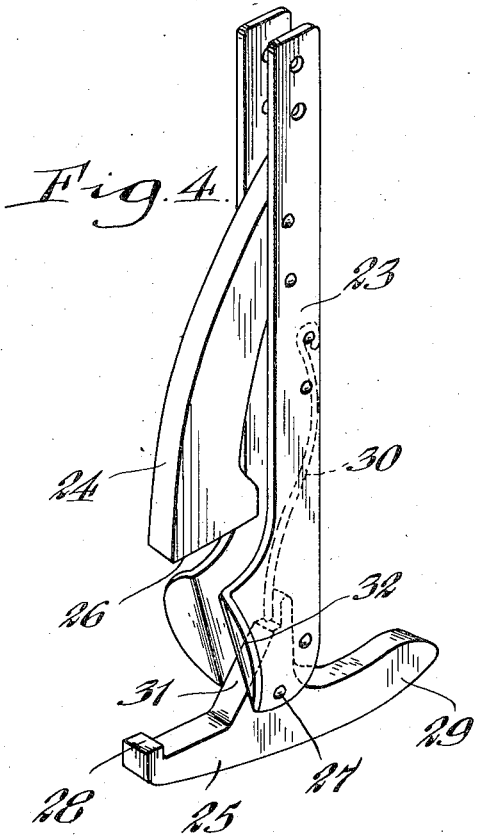
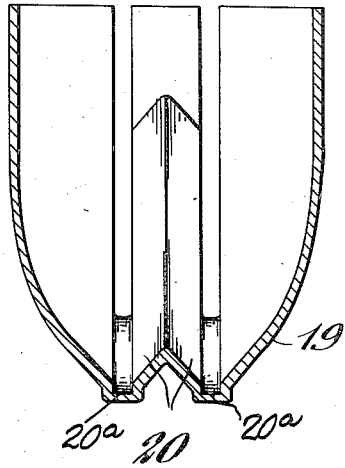
Inventor,
John Reuther,
by Walter P. Guyer
Attorney.

Patented Feb. 18, 1936

2,031,547

UNITED STATES PATENT OFFICE 2,031,547

POTATO PLANTER

John Reuther, East Aurora, N. Y.

Application August 16, 1934, Serial No. 740,170

10 Claims. (Cl. 221—133)

This invention relates generally to a planting apparatus but more particularly to a planter for potatoes.

One of its objects is to provide a machine of this character having reliable and efficient means for conveying and delivering potatoes at a predetermined distance apart into the trough or trench for receiving them, such means being so designed as to prevent injury to the potatoes during the planting operation.

Another object of the invention is to provide the planter with simple and automatically-actuated conveyor means for grasping and releasing the potatoes at predetermined times during the operation of the machine.

A further object is the provision of a potato planter which is simple, compact and inexpensive in construction and reliable and efficient in operation.

In the accompanying drawings:—

Figure 1:
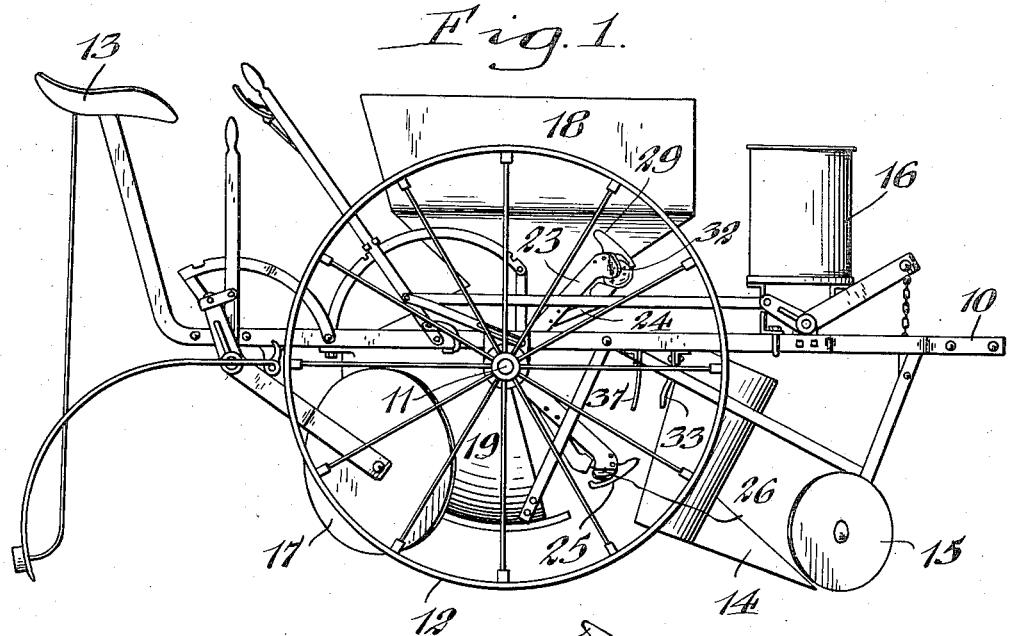
Figure 2:
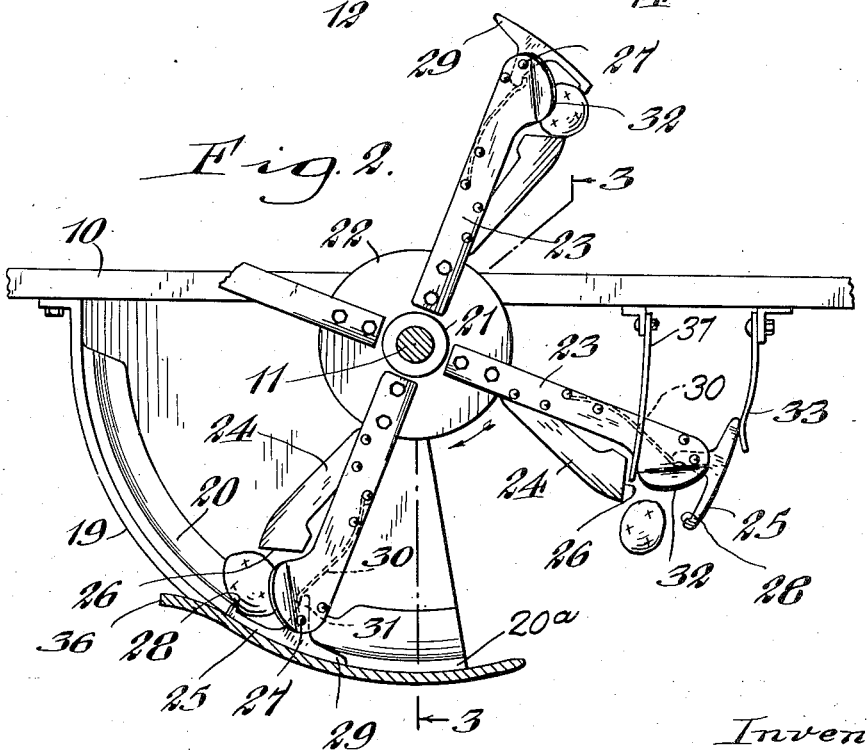

Figure 1 is a side elevation of a potato planter embodying my invention. Figure 2 is an enlarged, fragmentary side view, partly in section, of the potato conveyor unit. Figure 3 is a cross section taken substantially in the plane of line 3—3, Figure 2. Figure 4 is a detached perspective view of one of the potato-carrying and delivering arms. Figure 5 is a detailed sectional view taken also substantially in the plane of line 3—3, Figure 2, showing the potato-receiving trough through which the potato-carrying arms travel.

Similar characters of reference indicate corresponding parts throughout the several views.

The working parts of the machine are mounted upon a suitable frame 10 which carries an axle 11 upon which the traction wheels 12 are fixed in the usual manner. At its rear end the frame is provided with a seat 13 for the operator, while its front end is provided with a plow 14 which is arranged to form a trench or furrow in the ground for receiving the potatoes, and forwardly of the plow are disks 15 which furrow the ground to receive a fertilizer which may be fed by gravity from a container 16 mounted on the front end of the machine. At its rear end the machine may be provided with disks 17 which are arranged to cover the planted potatoes with the earth which was previously plowed up to form the trench.

Disposed substantially centrally of the machine and above the axle 11 is a hopper 18 for containing a supply of potatoes to be planted and below this hopper to receive the potatoes therefrom is a substantially trough-like receiver 19 secured to the frame 10, the same extending below the axle and located for the most part rearwardly of a vertical plane intersecting its axis. This receiver, in the example shown in the drawings, has its bottom wall of arcuate shape described about the axle and is provided therein with one or more circumferentially-extending grooves or channels 20 disposed side by side and into which the potatoes find their way when discharged from the hopper 18, the bottoms of these grooves terminating in counter-grooves 20a. The side walls of the receiver form aprons or shields. Mounted on the axle 11 to revolve therewith is a conveyor element which is designed to register with the channels 20 to successively pick up the potatoes and at predetermined points discharge them for planting. In its preferred construction, this conveyor element is preferably constructed as follows:—

Journaled on the axle 11 substantially centrally thereof is a sleeve 21 having annular flanges 22 thereon. Secured to each of these flanges are radially-disposed arms 23 which register with and are adapted to travel through the companion channels 20 in the trough-like receiver 19. At its outer end, each arm 23 has releasable gripping jaws 24 and 25 which are adapted to grasp and hold the potato during the travel of the arm through the receiver and at a predetermined point, forwardly of the axle, to release the potato and allow it to drop by gravity into the trench. The jaw 24 is fixed and is provided with an outwardly-facing gripping face 26 while the companion jaw 25 is movable, being pivoted intermediate its ends at 27 to the corresponding arm 23 and being provided at one end with an inwardly-directed gripping face 28 opposing that of the face of the fixed jaw 24. At its opposite end the movable jaw has an actuating element or tail piece 29 which, as will hereinafter appear, is adapted to be actuated at a predetermined point in the travel of the corresponding arms 23 to rock the jaw about its pivot and release the potato from between the companion jaws. A spring 30 carried by the arm and engaging the fulcrum portion 31 of the pivoted jaw 25 serves to constantly urge the latter toward the fixed jaw. At its outer end each arm 23 is shaped to provide laterally-disposed wings or abutments 32 against which the potato is adapted to seat, as seen in Figure 2, while being gripped by the jaws 24, 25. As the arms 23 enter the trough-like receiver 19, their pivoted jaws 25 ride in the counter-grooves 20a of the channels 20 in the manner shown in Figures 2 and 3, the groove-bottoms acting as an abutment to hold the pivoted jaw 25 in an open position to readily receive the potato between the jaws and the gripping face of each pivot-jaw being substantially flush with the bottom of the trough-channel 20 so that the potato rolls thereover into the throat formed by both jaws without piercing or otherwise injuring it. As seen in Figure 2, the rear or trailing portions of the grooves 20ᵃ may have their bottoms removed to form slots which permit the tail pieces of the jaws 25 to project therethrough to enable the jaws to assume a clamping position immediately after a potato has been received between the jaws.

At that point in the movement of the arms 23 where it is desired to release the potatoes to allow them to drop into the trench, there is provided a tappet 33 which is secured to the frame 10 and with which the tail pieces 29 of the movable jaws 25 are adapted to engage to automatically swing such jaws outwardly against the resistance of their companion springs 30 to the open position shown at the right hand side of Figure 2 to accordingly release the potato from between the jaws. Immediately upon passing by the tappet 33, the movable jaws are urged by their springs to a closed position and remain in that position until the tail pieces of the movable jaws encounter the bottoms of the corresponding channels 20 which engagement forces the movable jaws outwardly to an open position to receive another potato.

Associated with the conveyor unit is a clutch mechanism for effecting the coupling and uncoupling of the same to and from the axle 11 and to this end the arm-carrying sleeve 21 has a collar 34 thereon with which a companion sliding clutch collar 35 splined on the axle is adapted to engage. This shiftable collar may be controlled in any suitable manner from the driver's seat 13.

As seen in Figure 2, the bottom of the trailing end of each counter groove 20ᵃ in the receiver 19 is deflected outwardly, as indicated at 36, so as to effect a gradual closing of the pivoted jaw 25 after the potato has been received between the jaws. To prevent the potato accidently sticking to the fixed jaw 24 upon the release of the pivoted jaw by the tappet 33, I provide a stripping bar 37 which is positioned adjacent said tappet and acts to force the potato outwardly from the fixed jaw should it tend to adhere thereto.

I claim as my invention:—

1. In a potato planter, a receiver for the potatoes including a potato-engaging trough having a counter-groove therein below the plane thereof, and movable means mounted on said frame to traverse the receiver and having releasable potato-engaging jaws thereon, one of the jaws facing outwardly and being spaced from the bottom of the receiver, and the companion jaw being releasably movable toward and from the first-named jaw and engaging said counter-groove while traversing the receiver with its gripping face substantially flush with the adjoining bottom side of the receiver, the releasable jaw contacting with the bottom of the counter-groove to retain it in its open position to receive a potato.

2. In a potato planter, a receiver for the potatoes including a potato-engaging trough having a counter-groove therein below the plane thereof, means movable through said receiver and having releasable potato-grasping elements thereon, one of said elements occupying said counter-groove when in position to receive a potato and maintained by contact with its bottom in open position, and means disposed in the path of movement of said elements for effecting the release of the potatoes at a predetermined time.

3. In a potato planter, a trough-like receiver for the potatoes having a counter-groove therein means movable through said receiver for intercepting and individually removing the potatoes therefrom and consisting of spaced arms each having a fixed jaw and a companion releasable jaw between which a potato is adapted to be received, said releasable jaw traversing said counter-groove with its gripping face substantially flush with the receiver-bottom, and means disposed in the path of said releasable jaw for successively controlling its contraction and expansion to grip and release the potato, respectively, at predetermined points in the arm-movement, the releasable jaw contacting with the bottom of the counter-groove to retain it in its open position to receive a potato.

4. In a potato planter, a receiver for the potatoes, means movable through said receiver for intercepting and individually removing the potatoes therefrom and consisting of spaced arms each having a fixed jaw and a companion releasable jaw between which a potato is adapted to be received, a spring for constantly urging the releasable jaw to its contracted position, the bottom of said receiver having a counter-groove for receiving the releasable jaw with its gripping face substantially flush with the bottom of the receiver, the bottom of said counter-groove being shaped to control the opening and closing movements of said releasable jaw to receive and grasp a potato between the same and said fixed jaw, and means disposed beyond the receiver for effecting the movement of the companion jaw to a position to release the potato.

5. In a potato planter, a receiver having a bottom wall containing a potato-receiving groove and a counter-groove, a rotatable conveyor having a plurality of radial arms thereon adapted to traverse the receiver and each having releasable potato-gripping means arranged to register with said receiver-groove to intercept and grasp a potato, one of said means extending into said counter-groove with its gripping face substantially flush with the bottom of the receiver, and means for effecting the release of said potato-gripping means at a predetermined point in the movement of the conveyor, the groove-engaging gripping means having a part contacting the bottom of the counter-groove for maintaining such means in open position to receive a potato while traversing the receiver.

6. A potato planter, comprising a carriage including an axle, a receiver for potatoes mounted on said carriage and having a curved bottom wall described about said axle, a conveyor mounted on the axle to revolve therewith and including a plurality of radial arms adapted to traverse said receiver and each having at its outer end releasable potato-receiving jaws, means for normally maintaining the jaws contracted, means in the bottom of said receiver for guiding one of said jaws in a plane below the receiver-bottom and for automatically governing the opening and closing of such jaw relative to its companion jaw while traveling therethrough, and means disposed at one side of the receiver for automatically opening the jaws to discharge a pottato therefrom into the ground.

7. In a potato planter, a receiver for the potatoes, means movable through said receiver and having radially-disposed, releasable potato-grasping elements thereon for successively removing the potatoes from the receiver, means disposed in the path of movement of said elements for successively and automatically effecting the release of the potatoes at a predetermined time, and yieldable means in opposed adjoining relation to the releasing means for simultaneously stripping a potato from its grasping elements should it tend to adhere thereto.

8. In a potato planter, a substantially arcuate trough-like receiver for the potatoes having a concentrically arranged counter-groove therein, means movable through said receiver for intercepting and individually removing the potatoes therefrom and including a fixed jaw having an outwardly-facing gripping face spaced inwardly from the bottom of the receiver and a companion movable jaw pivoted to swing toward and from the fixed jaw and including a spring for constantly urging it to a clamping position toward said fixed jaw, the movable jaw engaging said counter-groove while traversing the receiver with its gripping face substantially flush with the adjoining bottom side of said receiver and having a tail piece engaging the bottom of said counter-groove for maintaining the movable jaw in its open position to receive a potato in the throat formed by said jaws.

9. In a potato planter, a substantially arcuate trough-like receiver for the potatoes having a concentrically arranged counter-groove therein, means movable through said receiver for intercepting and individually removing the potatoes therefrom and including a fixed jaw having an outwardly-facing gripping face spaced inwardly from the bottom of the receiver and a companion movable jaw pivoted to swing toward and from the fixed jaw and including a spring for constantly urging it to a clamping position toward said fixed jaw, the movable jaw engaging said counter-groove while traversing the receiver with its gripping face substantially flush with the adjoining bottom side of said receiver and having a tail piece engaging the bottom of said counter-groove for maintaining the movable jaw in its open position to receive a potato in the throat formed by said jaws, the bottom of said counter-groove terminating at its trailing end in an outwardly-deflected portion with which the tail piece of the movable jaw is adapted to engage to control the closing of said jaw about the potato after being received in the throat formed by the companion jaws.

10. In a potato planter, a revolvable arm terminating at its outer end in laterally-spaced abutments against which a potato is adapted to seat, a fixed jaw applied to said arm in substantially the plane of the space between said abutments and with its bearing face terminating adjacent the inner ends of the abutments, a movable jaw pivoted to the outer end of said arm including a potato-engaging portion disposed in opposing relation to the fixed jaw and extending forwardly and outwardly of said abutments, and a spring for constantly urging the movable jaw toward the fixed jaw to retain a potato therebetween and against said abutments.

JOHN REUTHER.